Aug. 28, 1923.

A. C. LIPPERT

SALT CAKE CUP

Filed Nov. 23, 1922

1,466,132

Inventor

Albert C. Lippert

By Frease and Bond

Attorneys

Patented Aug. 28, 1923.

1,466,132

UNITED STATES PATENT OFFICE.

ALBERT C. LIPPERT, OF CANTON, OHIO.

SALT-CAKE CUP.

Application filed November 23, 1922. Serial No. 602,747.

*To all whom it may concern:*

Be it known that I, ALBERT C. LIPPERT, a citizen of the United States, residing at Canton, in the county of Stark and State of Ohio, have invented a new and useful Salt-Cake Cup, of which the following is a specification.

This invention relates to a salt cake cup and has for its objects to provide a drinking cup or glass provided with means for containing a cake of salt, providing a convenient manner for readily preparing a bath of salt water for washing out the mouth or gargling the throat or like uses, without the necessity of preparing a salt solution with the use of granulated salt.

The objects of the invention are to provide a drinking cup or glass provided with an integral axial stem arranged to receive a cake of salt provided with a suitable opening to accommodate the stem, means being provided upon the stem for retaining the salt in the cup or glass when the same is tilted for drinking purposes.

The above and other objects may be attained by constructing the salt cup in the manner illustrated in the accompanying drawing, in which—

Figure 1:
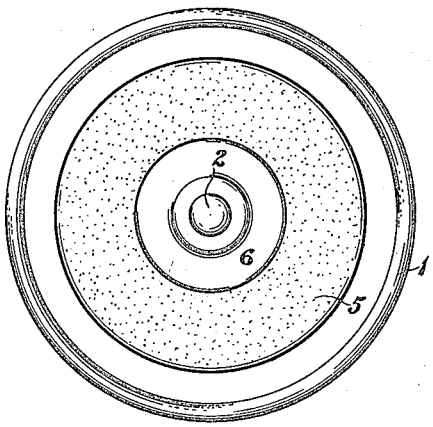

Figure 1 is a top plan view of a salt cup or glass embodying the invention; and

Figure 2:
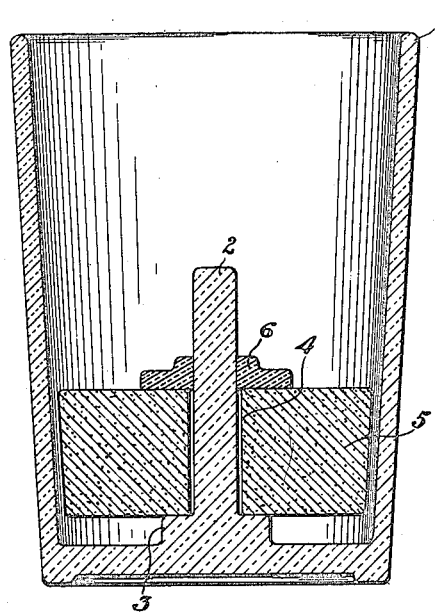

Fig. 2, a vertical, sectional view through the same.

Similar numerals of reference indicate corresponding parts throughout the drawing.

The cup 1 is provided with the upright axial stem 2 having the shouldered portion 3 at its lower end and terminating at a point substantially midway between the top and bottom of the cup.

The stem 2 is adapted to enter the axial aperture 4 formed in the cylindric cake of salt 5, the cake resting upon the shoulder 3 which spaces the same from the bottom of the cup.

A resilient washer 6, formed of rubber or the like, is spaced over the stem 2 and engages the upper surface of the salt cake, as shown in Fig. 2, retaining the cake in position upon the stem.

In using the cup to prepare a salt solution for a mouth wash or the like, the cup is filled with water, which in a short time will dissolve and become saturated with a sufficient amount of salt from the cake 5 to produce the desired salt solution.

The cup may be kept filled with water all of the time and may be kept covered for sanitary reasons, but in any event, whenever it is filled with water, a sufficient amount of salt will quickly dissolve to produce a saturate solution which is ready for use and, therefore, no more salt will dissolve until the solution is diluted by the addition of fresh water.

The salt cake may be cut out of rock salt or may be pressed from pulverized or granulated salt and when one cake has become entirely dissolved, it may be easily and readily replaced by removing the washer 6, and placing a new cake of salt upon the stem 2, after which the washer is replaced as shown in Fig. 2.

It will be seen that the salt cake is always held spaced from the bottom of the glass, permitting water to pass entirely around the cake upon all sides thereof, in order that sufficient salt to form a saturate solution may be quickly dissolved from the cake.

Although the cake 5 is described as being composed of salt, it will be understood that this cake may be composed of a mixture of salt and some other substance having desirable qualities for producing a mouth wash, or the cake may be made of any suitable disinfectant substance which may be pressed or formed into a solid cake.

I claim:—

1. A salt cup provided with a stem, and a salt cake having an aperture to receive the stem.

2. A salt cup provided with a stem, a salt cake having an aperture to receive the stem, and means for retaining the salt cake upon the stem.

3. A salt cup provided with a stem, a salt cake having an aperture to receive the stem, and means for spacing the salt cake from the bottom of the cup.

4. A salt cup provided with a stem, a salt cake having an aperture to receive the stem, and a shoulder at the lower end of the stem upon which the salt cake rests.

5. A salt cup provided with a stem, a salt cake having an aperture to receive the stem, and a resilient washer upon the stem for engaging the upper surface of the salt cake.

6. A salt cup provided with a stem, a salt cake having an aperture to receive the stem, a shoulder at the lower end of the stem upon which the salt cake rests, and a resilient washer upon the stem for engaging the upper surface of the salt cake.

ALBERT C. LIPPERT.